United States Patent
Okada et al.

(10) Patent No.: US 7,665,566 B2
(45) Date of Patent: Feb. 23, 2010

(54) ROUGH TERRAIN VEHICLE WITH ELECTRIC POWER STEERING SYSTEM

(75) Inventors: Megumu Okada, Saitama (JP); Akio Handa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 11/376,154

(22) Filed: Mar. 16, 2006

(65) Prior Publication Data

US 2006/0207823 A1 Sep. 21, 2006

(30) Foreign Application Priority Data

Mar. 18, 2005 (JP) ............................. 2005-080018

(51) Int. Cl.
*B60K 1/00* (2006.01)
(52) U.S. Cl. ...................... 180/291; 180/68.1; 180/296
(58) Field of Classification Search ................ 180/68.1, 180/68.2, 68.4, 376, 296, 309, 228, 311, 180/443, 291; 123/196 R, 198 C, 184.53, 123/54.4, 90.27, 90.31; 74/492
See application file for complete search history.

(56) References Cited

U.S. PATENT DOCUMENTS

| | | | | |
|---|---|---|---|---|
| 4,770,262 A * | 9/1988 | Yasunaga et al. | ........... | 180/68.1 |
| 4,971,171 A * | 11/1990 | Yamada et al. | ............ | 180/68.1 |
| 6,182,784 B1 * | 2/2001 | Pestotnik | .................... | 180/376 |
| 6,314,931 B1 * | 11/2001 | Yasuda et al. | .......... | 123/184.53 |
| 6,314,934 B1 * | 11/2001 | Ito et al. | .................. | 123/196 R |
| 6,332,444 B1 * | 12/2001 | Narita et al. | ............ | 123/196 R |
| 6,431,569 B2 * | 8/2002 | Handa | ................. | 280/124.138 |
| 6,668,966 B2 * | 12/2003 | Hasegawa et al. | ........... | 180/417 |
| 6,722,323 B2 * | 4/2004 | Kawamoto | .................. | 123/54.4 |
| 6,820,708 B2 * | 11/2004 | Nakamura | .................. | 180/68.2 |
| 6,920,949 B2 * | 7/2005 | Matsuura et al. | ........... | 180/68.2 |
| 6,988,573 B2 * | 1/2006 | Tsuruta et al. | ............. | 180/68.1 |
| 7,216,733 B2 * | 5/2007 | Iwami et al. | ................ | 180/68.1 |
| 7,264,086 B2 * | 9/2007 | Ito et al. | .................. | 123/196 R |
| 7,374,012 B2 * | 5/2008 | Inui et al. | ................... | 180/444 |
| 7,380,622 B2 * | 6/2008 | Shimizu | .................... | 180/68.1 |
| 2005/0284250 A1 * | 12/2005 | Suzuki | ........................ | 74/492 |
| 2006/0180385 A1 * | 8/2006 | Yanai et al. | .................. | 180/444 |
| 2006/0185927 A1 * | 8/2006 | Sakamoto et al. | ........... | 180/443 |
| 2006/0196722 A1 * | 9/2006 | Makabe et al. | .............. | 180/443 |

FOREIGN PATENT DOCUMENTS

JP 2004-231011 A 8/2004

* cited by examiner

*Primary Examiner*—Hau V Phan
(74) *Attorney, Agent, or Firm*—Birch, Stewart, Kolasch & Birch, LLP

(57) ABSTRACT

To effectively cool an electric power steering system having an electric motor. A rough terrain vehicle includes an electric motor that is disposed substantially orthogonal to a steering shaft with an engine and an exhaust pipe that are disposed behind the steering shaft and under a seat. A forced air cooling fan is provided for cooling the electric motor. The forced air cooling fan is provided behind the electric motor and in front of the engine or exhaust pipe.

20 Claims, 5 Drawing Sheets

ROUGH TERRAIN VEHICLE WITH ELECTRIC POWER STEERING SYSTEM

CROSS-REFERENCE TO RELATED APPLICATIONS

The present application claims priority under 35 USC 119 to Japanese Patent Application No. 2005-080018 filed on Mar. 18, 2005 the entire contents of which are hereby incorporated by reference.

FIELD OF THE INVENTION

The present invention relates to an improvement in a rough terrain vehicle that includes an electric power steering system.

DESCRIPTION OF BACKGROUND ART

A rough terrain vehicle including an electric power steering system that is disposed in front of an engine is disclosed, for example, in Japanese Patent Laid-open Publication No. 2004-231011.

As shown in FIGS. 1 and 2 of Japanese Patent Laid-open Publication No. 2004-231011, the electric power steering system includes a drive motor 60 that is disposed in front of an engine unit 3 mounted on an all terrain small four-wheeled vehicle 1 with an exhaust pipe 38 extending rearwardly from the front part of the engine unit 3.

When the vehicle is being operated, the drive motor 60 is cooled by air flowing over the motor. However, especially while the vehicle is stopped or operating at low speed, the drive motor 60 cannot be expected to be cooled by air flow. In addition, it is necessary to consider that heat generated by the engine unit 3 and exhaust pipe 38 radiates directly to the drive motor 60 to raise the temperature of the drive motor 60.

SUMMARY AND OBJECTS OF THE INVENTION

An object of the present invention is to improve a rough terrain vehicle including an electric power steering vehicle to effectively cool an electric motor.

According to an embodiment of the present invention, in a rough terrain vehicle includes an electric motor that is provided for an electric power steering system. The electric motor is disposed substantially orthogonal to a steering shaft. An engine and an exhaust pipe, connected to the engine, are disposed behind the steering shaft and under a seat. An air cooling fan is disposed behind the electric motor and in front of one of the engine and the exhaust pipe.

Air flow is introduced around the electric motor by the air cooling fan located behind the electric motor to cool the electric motor. The air cooling fan is located in front of the engine or exhaust pipe and prevents heat generated by the engine and exhaust pipe from radiating to the electric motor.

According to an embodiment of the present invention, the electric motor and air cooling fan are disposed at the same height in a side view.

The air cooling fan effectively introduces air flow around the electric motor located at the same height as the air cooling fan.

According to an embodiment of the present invention, the electric motor is disposed inside a component member constituting a body frame.

The power motor disposed within the component member constituting the body frame is protected by the component member on the outer side. The component member does not completely cover the side part of the electric motor, so that the electric motor easily dissipates heat by ventilation around the component member.

According to an embodiment of the present invention, a side cover is disposed on an outer side of the electric motor and a protection plate is disposed obliquely below and in front of the electric motor.

The outer side part of the electric motor is covered with the side cover, and the lower front part of the electric motor is covered with the protection plate. Accordingly, the electric motor is less likely to be directly hit by a stone or splashed with water, mud, and the like.

According to an embodiment of the present invention, a body side cover covering side part of the engine is provided with an opening.

Heat generated by the engine and exhaust pipe escapes to the outside through the opening of the body side cover.

According to an embodiment of the present invention, the air cooling fan generates air flow from the front to the rear of the vehicle for cooling both the electric motor and the engine or exhaust pipe behind the air cooling fan.

The electric motor in front of the air cooling fan and the engine or exhaust pipe behind the air cooling fan are exposed to the air flow generated by the air cooling fan from the front to the rear of the vehicle.

According to an embodiment of the present invention, the air cooling fan is provided behind the electric motor and in front of the engine or exhaust pipe. More specifically, heat generated by the electric motor can be air-cooled by the air cooling fan while the rough terrain vehicle 10 is stopped or operating at low speed. Furthermore, heat generated by the engine or exhaust pipe can be blocked by the air cooling fan so as not to radiate to the electric motor 96. Thus, the electric motor can be effectively cooled.

According to an embodiment of the present invention, the electric motor and the air cooling fan are disposed at the same height in a side view wherein air flow can be effectively introduced around the electric motor by the air cooling fan. Thus, an increase in the effectiveness of cooling the electric motor is achieved.

According to an embodiment of the present invention, the electric motor is disposed inside the component member of the vehicle frame. Accordingly, the side part of the electric motor is covered with the component member of the vehicle frame, and the electric motor can be protected. Moreover, according to the present invention it is possible to ensure air permeability and promote heat dissipation of the electric motor.

According to an embodiment of the present invention, the side cover is disposed on an outer side of the electric motor, and the protection plate is disposed obliquely below and in front of the electric motor. Accordingly, the outer side part of the electric motor is covered with the side cover, and the lower front part of the electric motor is covered with the protection plate. Thus, the electric motor is further prevented from being directly hit by a stone and the like and from being splashed with water, mud, and the like.

According to an embodiment of the present invention, the body side cover covering the side part of the engine is provided with the opening. Accordingly, the body side cover allows heat from the electric motor or heat from the engine and exhaust pipe to escape to the outside by exhaust wind through the opening.

According to an embodiment of the present invention, the air cooling fan generates air flow from the front to the rear of the vehicle for cooling both the electric motor and the engine or exhaust pipe behind the air cooling fan. Accordingly, the electric motor and the engine or exhaust pipe can be effectively cooled by the air flow from the front to the rear of the vehicle generated by the air cooling fan.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
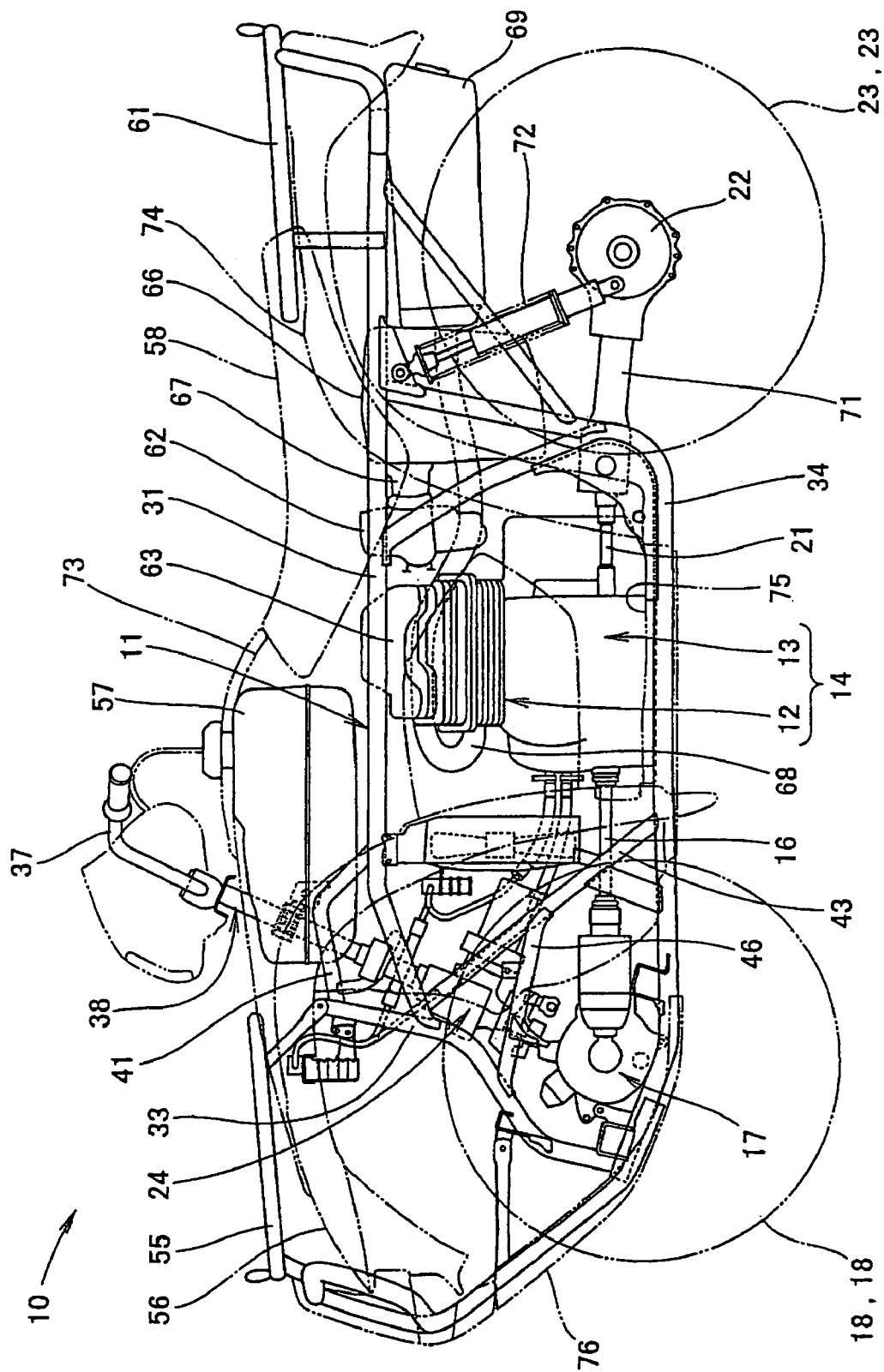
FIG. 1 is a side view of a rough terrain vehicle including an electric power steering system according to the present invention.

A description is given of a best mode for carrying out the present invention below based on the accompanying drawings. Note that the drawings are viewed in the direction of the reference numerals.

FIG. 1 is a side view of a rough terrain vehicle 10 including an electric power steering system according to the present invention. The rough terrain vehicle 10 is a four-wheel-drive vehicle including an electric power steering system 24. In the rough terrain vehicle 10, a power unit 14 including an engine 12 and a transmission 13 is mounted in the center of a body frame 11, and the front part of the transmission 13 is coupled to a front final reduction gear unit 17 through a front propeller shaft 16. The front final reduction gear 17 is coupled to right and left front wheels 18 and 18 through a not-shown drive shaft. The rear part of the transmission 13 is coupled to a rear final reduction gear unit 22 through a rear propeller shaft 21 with the rear final reduction gear 22 being coupled to right and left wheels 23 and 23 through a not-shown drive shaft. The electric power steering system 24 reduces steering force to steer the front wheels 18 and 18.

The body frame 11 includes a pair of right and left upper main frames 31 and 32 (only the frame 31 on the near side is shown) with a front frame 33 being of an inverted U-shape in a front view. A pair of right and left lower main frames 34 and 36 (only the frame 34 is shown) are provided with a pair of right and left doglegged front upper frames 41 and 42 (only the frame 41 on the near side is shown). A pair of right and left tilt frames 43 and 44 (only the frame 43 is shown) are provided with a pair of sub-tilt frames 46 and 47 (only the frame 46 is shown). The upper main frames 31 and 32 extend forward and rearward. The front frame 33 is coupled to front ends of the upper main frames 31 and 32. The lower main frames 34 and 36 are coupled to the lower ends of the front frame 33 and intermediate portions of the upper main frames 31 and 32. The front upper frames 41 and 42 are coupled to the upper end of the front frame 33 and the upper main frames 31 and 32 to rotatably support an upper part of a steering shaft 38. To the upper end of the steering shaft 38, a handle 37 is attached. The tilt frames 43 and 44 are coupled to the upper ends of the upper main frames 31 and 32, extend rearward and downward, and are coupled to the lower main frames 34 and 36, respectively. The sub-tilt frames 46 and 47 are coupled to intermediate portions of the tilt frames 43 and 44 and the front frame 33, respectively, to support the lower part of the electric power steering system 24.

A front carrier 55 is provided together with a front fender 56 for covering upper and rear portions of the wheels 18 and 18. A fuel tank 57 is provided adjacent to a seat 58 with a rear carrier 61 being mounted to the rear of the seat 58. A carburetor 62 is coupled to a rear part of a cylinder head 63 of the engine 12 with an air cleaner 66 coupled to the carburetor 62 through a connecting tube 67. An exhaust pipe 68 extends from a front part of the cylinder head 63 toward the rear of the vehicle with a muffler 69 being connected to the rear end of the exhaust pipe 68. A swing arm 71 swingably supports rear wheels 23 and 23 on the lower main frames 34 and 36, respectively. A pair of right and left shock absorbers 72, 72 are attached to the swing arm 71 and the upper main frames 31 and 32 to be laid therebetween (only the shock absorber 72 on the near side is shown). Body side covers 73, 37 are disposed on both sides of the power unit 14 with a rear fender 74 being provided for covering upper and front portions of the rear wheels 23 and 23. A step floor 75 is provided. A skid plate 76 covers the lower front parts of the right and left lower main frames 34 and 36 and front parts of the lower main frames 34 and 36.

Figure 2:
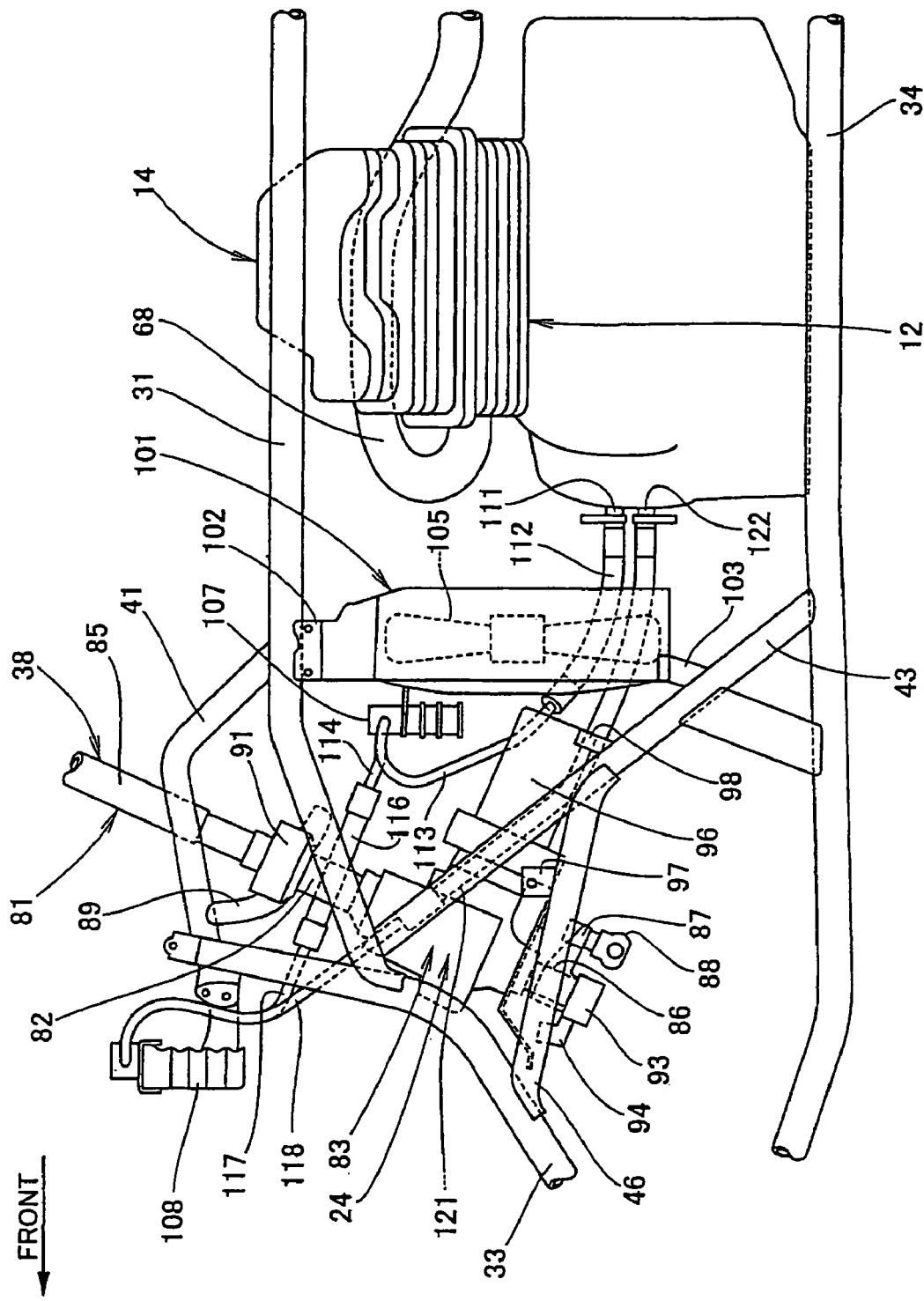
FIG. 2 is a side view of a main portion of the rough terrain vehicle according to the present invention.

FIG. 2 is a side view of a main portion of the rough terrain vehicle according to the present invention (an arrow (FRONT) in the drawing indicates the front side of the vehicle. The same goes for the other drawings.). The electric power steering system 24 includes a steering apparatus 81 for steering the front wheels 18 and 18 with a torque sensor unit 82 for detecting steering torque. A power assist unit 83 generates power to assist the steering force. A controller, that is not illustrated in the drawings, controls the power assist unit 83 based on the steering torque detected by the torque sensor unit 82 and the like.

The steering apparatus 81 includes the handle 37 (refer to FIG. 1), an input shaft 85, an output shaft 86, a steering arm 87, a pair of right and left ball joints 88 and 88 (only the ball joint 88 on the near side is shown.), and a pair of right and left tie rod (not shown). The input shaft 85 supports the handle 37, and the output shaft 86 is coupled to the input shaft 85 with the torque sensor unit 82 interposed therebetween. The steering arm 87 is attached to a lower end portion of the output shaft 86. The ball joints 88 and 88 are attached to the steering arm 87. One end of each tie rod is coupled to one of the ball joints 88 and 88, and the other end is coupled to a knuckle (not shown) on the front wheel 18 (refer to FIG. 1) side. The above input and output shafts 85 and 86 are members constituting the steering shaft 38.

The input shaft 85 is supported by an intermediate bearing unit 91, which is attached to sub-upper frames 89 and 89 (only the frame 89 on the near side is shown.). The sub-upper frames 89 and 89 are laid between the front upper frames 41 and 42 (only the frame 41 on the near side is shown.) and the upper main frames 31 and 32 (only the frame 31 is shown.).

The output shaft 86 is a member provided with a steering angle sensor 93, for detecting a steering angle (that is, a rotation angle of the steering shaft 38), at the top end. The steering angle sensor 93 is attached to the sub-tilt frames 46 and 47 (only the frame 46 on the near side is shown) through a bracket 94.

The torque sensor unit 82 is provided with a torsion bar (not shown) between the input shaft 85 and the output shaft 86.

When the input shaft 85 is rotated by an operation of the handle 37 (refer to FIG. 1), a relative rotation angle is generated between the input shaft 85 and the output shaft 86, and the torsion bar is twisted. This twisted amount is converted to torque to obtain the steering torque.

The power assist unit 83 includes an electric motor 96, a clutch (not shown), and a reduction gear box (not shown and composed of a worm gear and a worm wheel). The clutch and the reduction gear box are interposed between an output shaft of the electric motor 96 and the output shaft 86.

The electric motor 96 is supported by a motor support member 98. A front end part (on the output shaft 86 side) of the electric motor 96 is attached to motor brackets 97 and 97 (only the bracket 97 on the near side is shown), which are respectively provided for the sub-tilt frames 46 and 47, and a rear end part of the motor support member 98 is attached to the right and left tilt frames 43 and 44 (only the frame 43 is shown) to be laid therebetween.

The controller controls the power assist unit 83 based on the steering torque detected by the torque sensor unit 82, the steering angle detected by the steering angle sensor 93, speed of the rough terrain vehicle 10 (refer to FIG. 1), and the like.

A forced air cooling fan 101 is disposed between the electric power steering system 24 and the power unit 14. An upper part of the forced air cooling fan is attached to the upper main frames 31 and 32 through an upper bracket 102. A lower part of the forced air cooling fan is attached to the tilt frames 43 and 44 through a lower bracket 103. The forced air cooling fan 101 includes a fan body 105.

As described above, the forced air cooling fan 101 is disposed between the electric power steering system 24 (more specifically, the electric motor 96) and the power unit 14 (more specifically, the engine 12 and exhaust pipe 68). Heat generated by the electric motor 96 can be cooled by air flow generated by the forced cooling fan 101 from the front of the vehicle toward the rear of the vehicle. In addition, heat radiation from the engine 12 and exhaust pipe 68 toward the electric motor 96 can be blocked. Furthermore, the electric power steering apparatus 24 and forced air cooling fan 101 are disposed at substantially the same height. The electric power steering apparatus 24 can be therefore cooled more effectively by the air flow generated by the forced air cooling fan 101.

Moreover, the electric motor 96 is provided on the inner side of the tilt and sub-tilt frames 43 and 46, and the electric motor 96 can be protected by the tilt and sub-tilt frames 43 and 46 from collision with tree or stone.

Furthermore, the tilt and sub-tilt frames 43 and 46 do not cover the entire side of the electric motor 96. It is therefore possible to ensure air permeability and promote heat dissipation from the electric motor 96.

Oil coolers 107, 108 are provided for cooling the engine oil within the engine 12. An oil outlet 111 of the engine 12 is connected through a hose 112 and a tube 113 to the oil cooler 107. The oil cooler 107 is connected to the oil cooler 108 through a tube 114, a hose 116, and a tube 117. The oil cooler 108 is connected to an oil inlet 122 of the engine 12 through a tube 118 and a hose 121.

The oil cooler 107 is disposed near the forced air cooling fan 101, or, in front of the same. The forced air cooling fan 101 is for cooling the oil cooler 107.

As described above, the present invention includes the electric motor 96 that is disposed inside the tilt and sub-tilt frames 43 and 46 as components constituting the body frame 11.

Since the electric motor 96 is disposed inside the tilt and sub-tilt frames 43 and 46, the tilt and sub-tilt frames 43 and 46 cover the side part of the electric motor 96. The electric motor 96 can be therefore protected, and the air permeability is ensured to promote heat dissipation from the electric motor 96.

Figure 3:
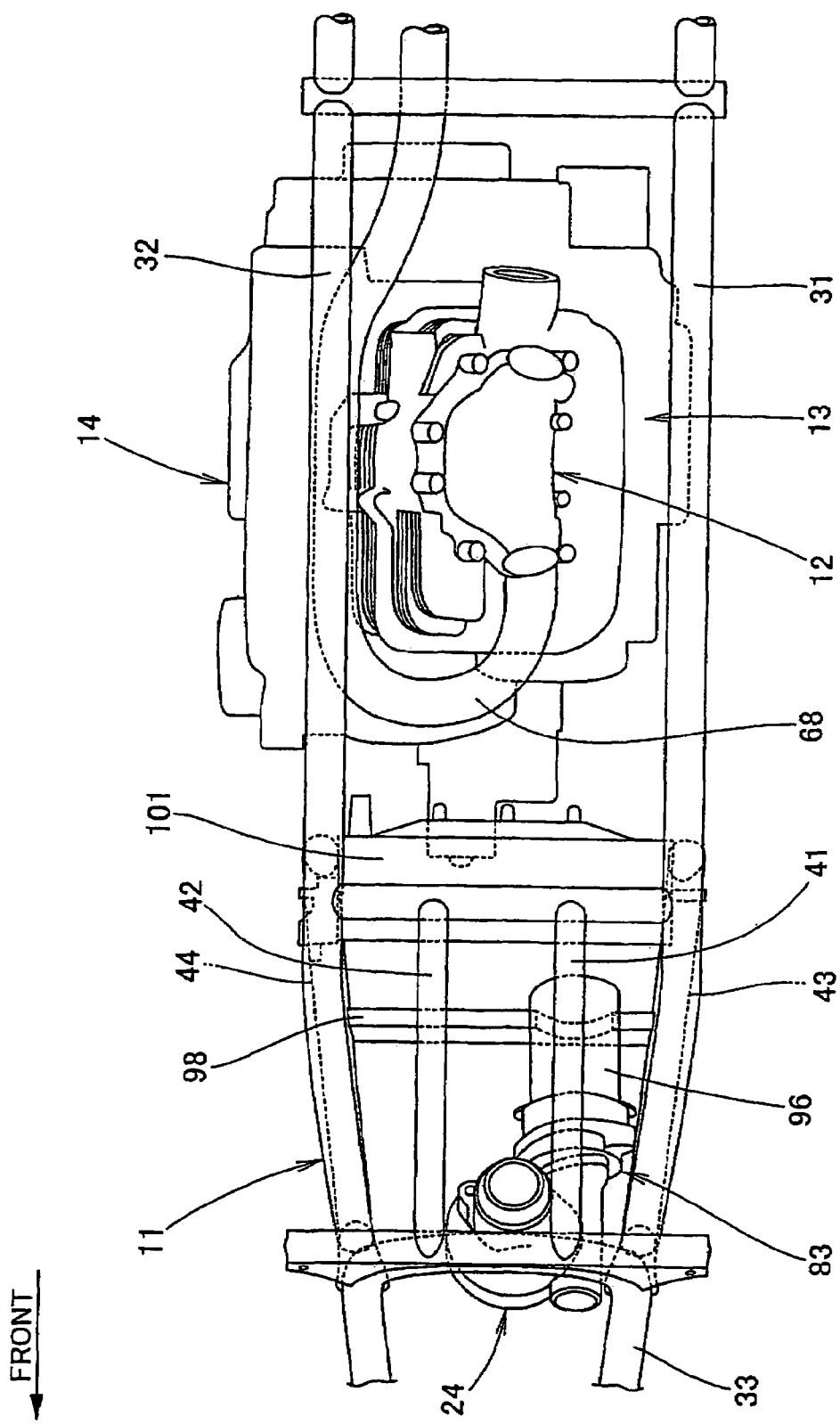
FIG. 3 is a plan view of the main portion of the rough terrain vehicle according to the present invention.

FIG. 3 is a plan view of a main portion of the rough terrain vehicle according to the present invention, showing that the forced air cooling fan 101 that is disposed behind the electric motor 96 and in front of the engine 12. The exhaust pipe 68 and the rear end portion of the electric motor 96 is supported by the motor support member 98 laid between the right and left tilt frames 43 and 44.

The motor support member 98 is a member serving as a cross member of the body frame 11.

The electric motor 96 is completely shielded by the forced air cooling fan 101 between the electric motor 96 and the engine 12 and exhaust pipe 68. Accordingly, even when the electric motor 96 is disposed so as to extend substantially toward the rear of the vehicle and the distances between the electric motor 96 and the engine 12 and exhaust pipe 68 are shortened, the electric motor 96 will not be directly exposed to radiant heat from the engine 12 and exhaust pipe 68.

Moreover, the rear end portion of the electric motor 96 is supported by the motor support member 98. The rear end portion of the electric motor 96 is therefore less likely to vibrate. A portion of the power assist unit 83 to which the electric motor 96 is attached, in particular, is less likely to be subjected to a large cyclic load.

Figure 4:
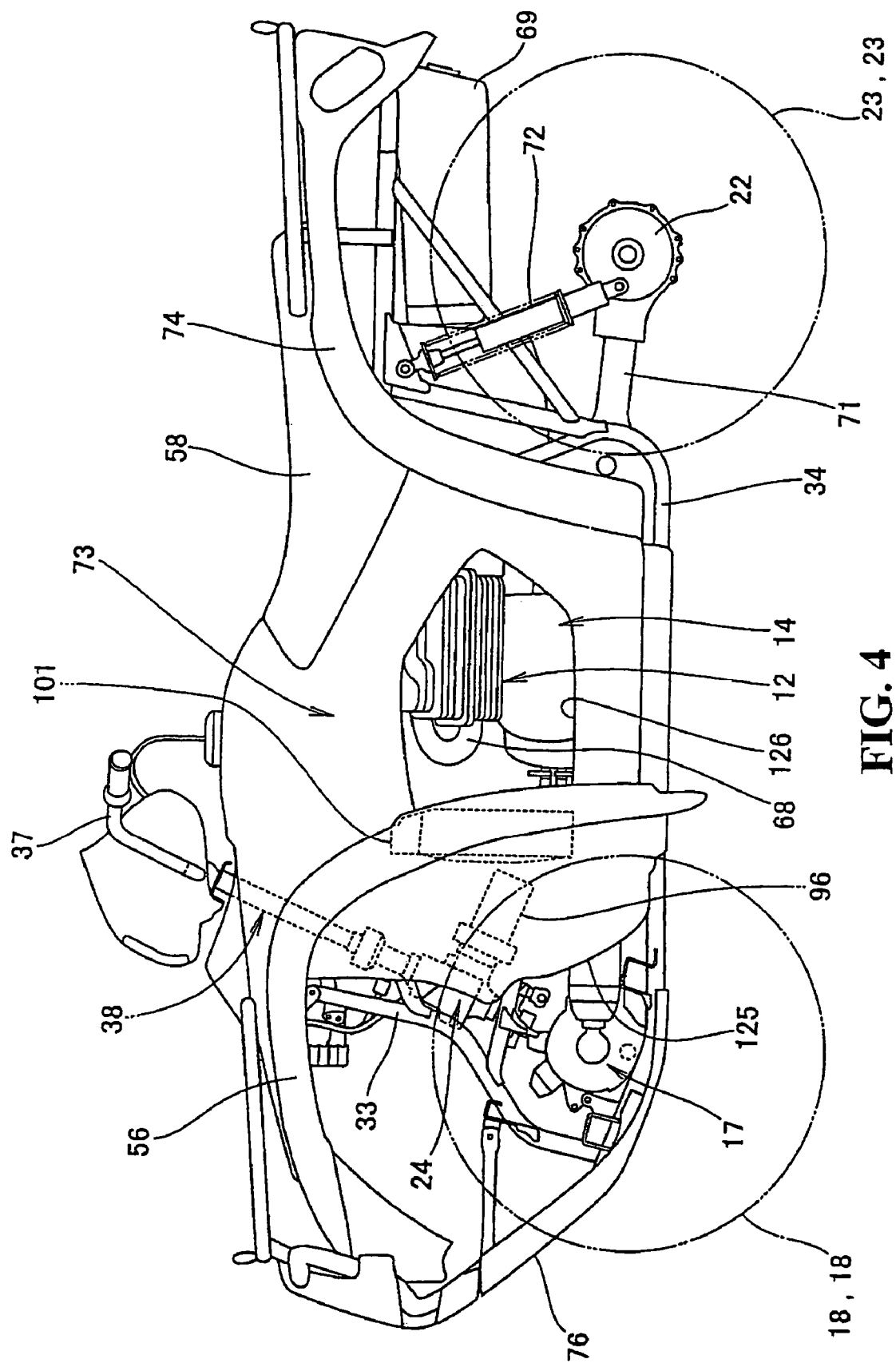
FIG. 4 is a side view showing the rough terrain vehicle according to the present invention with covers and the like attached thereto.

FIG. 4 is a side view showing the rough terrain vehicle according to the present invention with covers and the like attached thereto. One of the side covers 125 is provided on the inner side of the front fender 56 and an opening 126 is provided for one of the body side covers 73. Each side cover 125 covers a rear part of the electric power steering system 24, or an outer side part of the electric motor 96.

Such a side cover 125 can prevent the electric motor 96 from being splashed with a stone, mud, or the like from the side of the vehicle body. Moreover, the side cover 125 can straighten the air flow within the vehicle body, thus accelerating the cooling of the heated electric motor 96 by air flow.

The opening 126 allows air warmed by the electric motor 96, engine 12, and exhaust pipe 68 within the front fender 56, side cover 125, and body side cover 73 to be discharged to the outside. Furthermore, the opening 126 is also used for maintenance of the power unit 14. For example, it is possible to perform a spark plug change, clutch play adjustment, and the like through the opening 126.

Next, a description is given with regard to the operation of the aforementioned forced air cooling fan 101 and openings 126.

Figure 5:
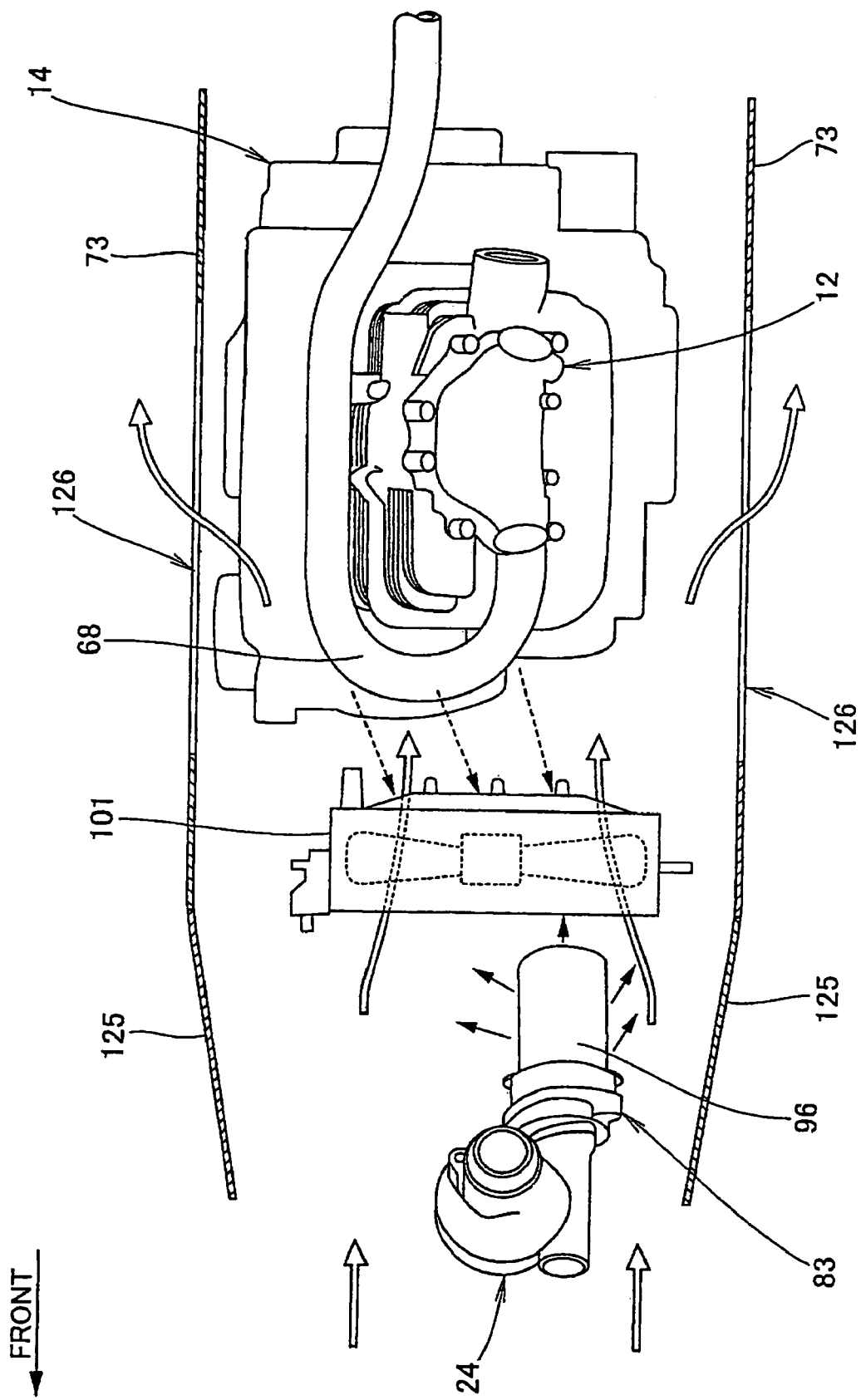
FIG. 5 is an operation view explaining heat and air flow inside a vehicle body according to the present invention.

FIG. 5 is an operational view explaining heat and air flows inside the vehicle body according to the present invention.

When the forced air cooling fan 101 is operated while the vehicle is stopped or during operation of the vehicle, air flow (indicated by outline arrows) flows into the vehicle body from the front of the vehicle and draws heat generated by the electric motor 96 (heat radiation is indicated by solid arrows). The air flow then passes through the forced air cooling fan 101, draws heat generated by the engine 12 and exhaust pipe 68, and then flows to the outside from the openings 126.

At this time, the right and left side cover 125 and 125 straighten air flow passing near the electric power steering system 24 into a flow toward the rear of the vehicle and feeds the air flow between the body side covers 73 and 73. Accordingly, the air flow inside the side covers 125 and 125 and body side covers 73 and 73 speeds up to increase the effect of the air for cooling the electric motor 96, engine 12, and exhaust pipe 68.

Moreover, the heat radiated from the engine 12 and exhaust pipe 68 toward the electric motor 96 (indicated by dashed arrows) is blocked by the forced air cooling fan 101 and does not reach the electric motor 96.

Accordingly, the electric motor 96 can be effectively cooled by the forced air cooling fan 101 forming an air flow for blocking heat.

As shown in above FIGS. 1, 2, and 5, the present invention includes the rough terrain vehicle 10 (refer to FIG. 1), in which the electric motor 96 is provided for the electric power steering system 24. The electric motor 96 is disposed substantially orthogonal to the steering shaft 38. The engine 12 and the exhaust pipe 68, which is connected to the engine 12, are disposed behind the steering shaft 38 and under the seat 58 (refer to FIG. 1). The forced air cooling fan 101 is provided for cooling the electric motor 96. The forced air cooling fan 101 is provided behind the electric motor 96 and in front of the engine 12 and exhaust pipe 68.

Since the forced air cooling fan 101 is provided behind the electric motor 96 and in front of the engine 12 or exhaust pipe 68, more specifically, heat generated by the electric motor 96 can be air-cooled by the forced air cooling fan 101 while the rough terrain vehicle 10 is stopped or being operated at a low speed. Furthermore, heat generated by the engine 12 or exhaust pipe 68 can be blocked by the forced air cooling fan 101 so as not to be radiated to the electric motor 96. Thus, the electric motor 96 can be effectively cooled.

Moreover, the present invention includes the electric motor 96 and the forced air cooling fan 101 that are disposed at the same height.

Since the electric motor 96 and the forced air cooling fan 101 are disposed at the same height in a side view, an air flow can be effectively introduced around the electric motor 96 by the forced air cooling fan 101. Thus, an increase in the effectiveness of cooling the electric motor 96 is achieved.

Furthermore, the present invention includes the side covers 125 that are disposed on the outer sides of the electric motor 96. The skid plate 76, as a protection plate, is disposed in obliquely below and in front of the electric motor 96.

Since the side covers 125 and 125 are disposed on the outer sides of the electric motor 96 and the skid plate 76 is disposed under the electric motor 96, the outer side parts of the electric motor 96 are covered with the respective side covers 125, and the lower front part of the electric motor 96 is covered with the skid plate 76. Thus, the electric motor 96 can be further prevented from being directly hit by a stone or from being splashed with water, mud, or the like.

Still furthermore, the present invention includes the right and left side covers 73 and 73, for covering side parts of the engine 12 that are individually provided with openings 126 and 126.

Through the openings 126 and 126 of the respective body side covers 73 and 73, for covering the side parts of the engine 12, heat from the electric motor 96 or heat from the engine 12 and exhaust 68 can be released to the outside with the exhaust.

Sill furthermore, the forced air cooling fan 101 generates an air flow from the front to the rear of the vehicle for cooling both the electric motor 96 and the engine 12 or the exhaust pipe 68 behind the forced air cooling fan 101.

Since the forced air cooling fan is configured to be capable of cooling both the electric motor 96 and the engine 12 or the exhaust pipe 68, the electric motor 96 and the engine 12 or the exhaust pipe 68 can be effectively cooled by the forced air cooling fan 101.

In this embodiment, as shown in FIG. 5, the forced air cooling fan 101 is operated both while the vehicle is stopped and during operation. However, the present invention is not limited to this embodiment and may be operated only while the vehicle is stopped or during operation of the vehicle at a low speed.

As shown in FIG. 3, the electric motor 96 is disposed to extend substantially in the front-rear direction of the vehicle. However, the present invention is not limited to this embodiment and may be disposed to extend substantially in the vehicle width direction. In this case, the electric motor 96 is farther from the engine 12 and exhaust pipe 68. The electric motor 96 can therefore be less likely to be influenced by heat from the engine 12 and the exhaust pipe 68.

The present invention is suitable for a rough terrain vehicle that includes an electric power steering system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rough terrain vehicle with an electric power steering system, comprising:
    an electric motor for the electric power steering system, the electric motor having an axis that extends rearwardly and downwardly in a direction approximately orthogonal to a steering shaft;
    an engine and an exhaust pipe connected to the engine being disposed behind the steering shaft and under a seat; and
    an air cooling fan for the engine disposed behind the electric motor and in front of at least one of the engine and the exhaust pipe,
    wherein the electric motor is arranged on one side of the steering shaft and the exhaust pipe is arranged on the other side of the steering shaft in a plan view.

2. The rough terrain vehicle with an electric power steering system according to claim 1, wherein the electric motor and the air cooling fan are disposed at an equal height when viewed from the side.

3. The rough terrain vehicle with an electric power steering system according to claim 2, wherein the electric motor extends downwardly and rearwardly from one lateral side of the steering shaft.

4. The rough terrain vehicle with an electric power steering system according to claim 1, wherein the electric motor is disposed inside a component member constituting a body frame.

5. The rough terrain vehicle with an electric power steering system according to claim 1, wherein a side cover is disposed on the outside of the electric motor and a protection plate is disposed obliquely below and in front of the electric motor.

6. The rough terrain vehicle with an electric power steering system according to claim 1, wherein a body side cover covering a side part of the engine is provided with an opening.

7. The rough terrain vehicle with an electric power steering system according to claim 1, further comprising a motor support member extending laterally across the vehicle for supporting a rear end of the electric motor.

8. The rough terrain vehicle according to claim 7, and since the rear end of the electric motor is supported by the motor support member extending laterally across the vehicle, the rear end portion of the electric motor is therefore less likely to vibrate, and a portion of the electric power steering system to which the electric motor is attached is less likely to be subjected to a large cyclic load.

9. The rough terrain vehicle according to claim 7, wherein a body frame of the rough terrain vehicle includes left and right upper main frames, left and right lower main frames, and left and right tilt frames extending rearwardly and downwardly from the upper main frames, wherein motor support member which supports the rear end of the electric motor extends laterally across the vehicle between the left and right tilt frames.

10. The rough terrain vehicle with an electric power steering system according to claim 1, further comprising at least one oil cooler disposed in front of the air cooling fan.

11. The rough terrain vehicle with an electric power steering system according to claim 1, wherein the air cooling fan generates air flowing from the front to the rear of the vehicle to cool both the electric motor and at least one of the engine and the exhaust pipe behind the air cooling fan.

12. The rough terrain vehicle according to claim 1, wherein a body frame of the rough terrain vehicle includes left and right upper main frames, left and right lower main frames, and left and right tilt frames extending rearwardly and downwardly from the upper main frames, wherein the left and right tilt frames overlap the electric motor for the power steering system when the vehicle is viewed in side view.

13. A rough terrain vehicle; comprising:

an electric motor for an electric power steering system and an engine and an exhaust pipe connected to the engine being disposed behind a steering shaft comprising:

an air cooling fan for the engine disposed behind the electric motor and in front of at least one of the engine and the exhaust pipe for cooling the electric motor and at least one of the engine and the exhaust pipe with an air flow, wherein electric motor is cylindrically shaped, with an axis extending downwardly and rearwardly from the steering shaft in a side view.

14. The rough terrain vehicle with an electric power steering system according to claim 13, further comprising a motor support member extending laterally across the vehicle for supporting a rear end of the electric motor.

15. The rough terrain vehicle with an electric power steering system according to claim 13, further comprising at least one oil cooler disposed in front of the air cooling fan.

16. The rough terrain vehicle according to claim 14, and since the rear end of the electric motor is supported by the motor support member extending laterally across the vehicle, the rear end portion of the electric motor is therefore less likely to vibrate, and a portion of the electric power steering system to which the electric motor is attached is less likely to be subjected to a large cyclic load.

17. The rough terrain vehicle according to claim 14, wherein a body frame of the rough terrain vehicle includes left and right upper main frames, left and right lower main frames, and left and right tilt frames extending rearwardly and downwardly from the upper main frames, wherein motor support member which supports the rear end of the electric motor extends laterally across the vehicle between the left and right tilt frames.

18. The rough terrain vehicle according to claim 13, wherein the electric motor and the air cooling fan are disposed at an equal height when viewed from the side.

19. The rough terrain vehicle according to claim 13, wherein the electric motor is disposed inside a component member constituting a body frame.

20. The rough terrain vehicle according to claim 13, wherein a body frame of the rough terrain vehicle includes left and right upper main frames, left and right lower main frames, and left and right tilt frames extending rearwardly and downwardly from the upper main frames, wherein the left and right tilt frames overlap the electric motor for the power steering system when the vehicle is viewed in side view.

* * * * *